(12) United States Patent
Derelöv (10) Patent No.: US 10,670,064 B2
(45) Date of Patent: Jun. 2, 2020

(54) PANEL WITH A SLIDER

(71) Applicant: Välinge Innovation AB, Viken (SE)

(72) Inventor: Peter Derelöv, Helsingborg (SE)

(73) Assignee: VALINGE INNOVATION AB, Viken (SE)

( * ) Notice: Subject to any disclaimer, the term of this patent is extended or adjusted under 35 U.S.C. 154(b) by 0 days.

(21) Appl. No.: 15/562,254

(22) PCT Filed: Apr. 18, 2016

(86) PCT No.: PCT/SE2016/050333
§ 371 (c)(1),
(2) Date: Sep. 27, 2017

(87) PCT Pub. No.: WO2016/171607
PCT Pub. Date: Oct. 27, 2016

(65) Prior Publication Data
US 2018/0080488 A1 Mar. 22, 2018

(30) Foreign Application Priority Data
Apr. 21, 2015 (SE) ........................ 1550471

(51) Int. Cl.
*F16B 12/12* (2006.01)
*A47B 88/43* (2017.01)
*F16B 12/26* (2006.01)

(52) U.S. Cl.
CPC .............. *F16B 12/12* (2013.01); *A47B 88/43* (2017.01); *A47B 2210/0056* (2013.01); *F16B 12/26* (2013.01)

(58) Field of Classification Search
CPC .......... F16B 12/12; F16B 12/26; A47B 88/43; A47B 2210/0056; A47B 61/02;
(Continued)

(56) References Cited

U.S. PATENT DOCUMENTS 291,032 A 1/1884 Cleland
634,581 A 10/1899 Miller
(Continued)

FOREIGN PATENT DOCUMENTS

CH 365 507 A 11/1962
CH 685 276 A5 5/1995
(Continued)

OTHER PUBLICATIONS

U.S. Appl. No. 14/486,681, Hans Brännström, Agne Pålsson and Peter Derelöv, filed Sep. 15, 2014, (Cited herein as US Patent Application Publication No. 20142015/0078807 A1 of Mar. 19, 2015).
(Continued)

*Primary Examiner* — Jennifer E. Novosad
(74) *Attorney, Agent, or Firm* — Buchanan Ingersoll & Rooney P.C.

(57) ABSTRACT

A set including a panel and a slider, such as a drawer slider. The slider including a slider surface and the panel comprising a panel surface. The slider is configured to be assembled to the panel with the slider surface facing the panel surface. The panel surface is provided with an insertion groove and an undercut groove, which are of a longitudinal shape. A strip protrudes from the slider surface, and the strip is configured to be inserted into the insertion groove and the undercut groove by an angling motion.

19 Claims, 7 Drawing Sheets

(58) Field of Classification Search
CPC ... A47B 95/008; A47B 96/067; A47F 5/0838;
A47F 5/0846; A47F 5/0853; A47F 5/08
USPC .......... 211/94.01, 87.01, 90.01; 248/222.51,
248/223.41, 224.51, 224.61, 220.21,
248/220.22; 52/36.4, 36.5; D6/491, 504,
D6/492, 466–469, 509; D25/119, 123
See application file for complete search history.

(56) References Cited

U.S. PATENT DOCUMENTS

| | | | |
|---|---|---|---|
| 701,000 A | 5/1902 | Ahrens | |
| 861,911 A | 7/1907 | Stewart | |
| 881,673 A | 3/1908 | Ellison | |
| 1,533,099 A | 4/1925 | Carroll | |
| 1,534,468 A | 4/1925 | Shea, Jr. | |
| 1,800,386 A * | 4/1931 | Hoffman | A47F 5/0846 248/307 |
| 1,800,387 A * | 4/1931 | Greist | A47F 5/0846 211/94.01 |
| 1,802,245 A * | 4/1931 | Foretich | A47B 57/10 108/186 |
| 1,954,242 A | 4/1934 | Heppenstall | |
| 2,360,451 A | 10/1944 | Stone | |
| 2,362,904 A | 11/1944 | Kramer | |
| 2,496,184 A | 1/1950 | Von Canon | |
| 2,681,483 A | 6/1954 | Morawetz | |
| 3,002,630 A * | 10/1961 | Heisser | A47K 1/09 211/65 |
| 3,195,968 A | 7/1965 | Freeman | |
| 3,284,152 A | 11/1966 | Schörghuber | |
| 3,313,054 A * | 4/1967 | Madey | A47F 5/0846 40/651 |
| 3,347,610 A | 10/1967 | Pilliod | |
| 3,410,441 A | 11/1968 | Rhyne | |
| 3,722,704 A | 3/1973 | Piretti | |
| 3,722,971 A | 3/1973 | Zeischegg | |
| 3,742,807 A | 7/1973 | Manning | |
| 3,765,465 A | 10/1973 | Gulistan | |
| 3,784,271 A | 1/1974 | Schreiber | |
| 3,884,002 A | 5/1975 | Logie | |
| 3,885,845 A | 5/1975 | Krieks | |
| 3,981,118 A * | 9/1976 | Johnson | B66B 23/24 52/716.8 |
| 4,089,614 A | 5/1978 | Harley | |
| 4,099,887 A | 7/1978 | Mackenroth | |
| 4,116,510 A | 9/1978 | Franco | |
| 4,142,271 A | 3/1979 | Busse | |
| 4,211,379 A * | 7/1980 | Morgan | A47B 96/067 248/222.51 |
| 4,222,544 A * | 9/1980 | Crowder | A47G 1/1686 248/222.51 |
| 4,279,397 A | 7/1981 | Larsson | |
| 4,299,067 A | 11/1981 | Bertschi | |
| 4,308,961 A * | 1/1982 | Kunce | A47F 5/0853 211/57.1 |
| 4,324,517 A | 4/1982 | Dey | |
| 4,403,886 A | 9/1983 | Haeusler | |
| 4,405,253 A | 9/1983 | Stockum | |
| 4,509,648 A | 4/1985 | Govang | |
| 4,593,734 A | 6/1986 | Wallace | |
| 4,595,105 A | 6/1986 | Gold | |
| 4,597,122 A | 7/1986 | Handler | |
| 4,615,448 A * | 10/1986 | Johnstonbaugh | A47F 5/0846 211/189 |
| 4,629,076 A * | 12/1986 | Amstutz | A47F 5/0846 156/64 |
| 4,750,794 A | 6/1988 | Vegh | |
| 4,752,150 A | 6/1988 | Salice | |
| 4,815,908 A | 3/1989 | Duran et al. | |
| 4,817,900 A * | 4/1989 | Whittington | A47B 57/585 211/162 |
| 4,844,266 A * | 7/1989 | Small | A47F 5/005 211/88.01 |
| 4,883,331 A | 11/1989 | Mengel | |
| 4,886,326 A | 12/1989 | Kuzyk | |
| 4,888,933 A | 12/1989 | Guomundsson | |
| 4,891,897 A * | 1/1990 | Gieske | A47F 5/0846 211/189 |
| 4,909,581 A | 3/1990 | Haheeb | |
| 4,938,625 A | 7/1990 | Matsui | |
| 4,944,416 A * | 7/1990 | Petersen | A47F 5/0846 211/87.01 |
| 4,961,295 A * | 10/1990 | Kosch, Sr. | A47F 5/0846 211/94.02 |
| 5,004,116 A | 4/1991 | Cattarozzi | |
| 5,018,323 A * | 5/1991 | Clausen | A47F 5/0846 211/189 |
| 5,109,993 A * | 5/1992 | Hutchison | A47F 5/0846 211/59.1 |
| 5,114,265 A | 5/1992 | Grisley | |
| 5,121,578 A * | 6/1992 | Holz | E04B 9/26 52/506.01 |
| 5,125,518 A * | 6/1992 | Ward | A47F 5/0846 211/87.01 |
| 5,138,803 A * | 8/1992 | Grossen | A47F 5/0846 211/103 |
| 5,209,556 A | 5/1993 | Anderson | |
| 5,212,925 A | 5/1993 | McClinton | |
| 5,299,509 A * | 4/1994 | Ballard | A47B 96/02 100/106 |
| 5,360,121 A * | 11/1994 | Sothman | A47F 5/0846 211/87.01 |
| 5,375,802 A * | 12/1994 | Branham, II | A47F 5/0846 211/94.01 |
| 5,423,155 A * | 6/1995 | Bauer | A47F 5/0846 40/618 |
| 5,451,102 A | 9/1995 | Chuan | |
| 5,458,433 A | 10/1995 | Statsny | |
| 5,471,804 A | 12/1995 | Winter, IV | |
| 5,475,960 A | 12/1995 | Lindal | |
| 5,499,667 A | 3/1996 | Nakanishi | |
| 5,499,886 A | 3/1996 | Short et al. | |
| 5,507,331 A | 4/1996 | Nakanishi | |
| 5,527,103 A | 6/1996 | Pittman | |
| 5,658,086 A | 8/1997 | Brokaw et al. | |
| 5,711,115 A * | 1/1998 | Wirt | F24B 1/198 52/36.3 |
| 5,775,521 A * | 7/1998 | Tisbo | A47B 17/033 211/11 |
| 5,810,505 A | 9/1998 | Henriott | |
| 5,893,617 A | 4/1999 | Lee | |
| 5,941,026 A * | 8/1999 | Eisenreich | A47F 5/0846 211/103 |
| 5,944,294 A * | 8/1999 | Baer | B25H 3/04 248/220.43 |
| 5,950,389 A | 9/1999 | Porter | |
| 6,045,290 A | 4/2000 | Nocievski | |
| 6,050,426 A * | 4/2000 | Leurdijk | A47B 96/067 211/57.1 |
| 6,142,436 A * | 11/2000 | Thurston | A47B 96/067 211/100 |
| 6,312,186 B1 | 11/2001 | Röck et al. | |
| 6,349,507 B1 * | 2/2002 | Muellerleile | A47F 5/0846 108/106 |
| 6,363,645 B1 * | 4/2002 | Hunter | A47F 5/0846 211/87.01 |
| 6,413,007 B1 | 7/2002 | Lambright | |
| 6,418,683 B1 | 7/2002 | Martensson | |
| 6,491,172 B2 * | 12/2002 | Chance | A47F 5/0846 211/87.01 |
| 6,505,452 B1 | 1/2003 | Hannig | |
| 6,547,086 B1 * | 4/2003 | Harvey | A47F 5/0846 211/87.01 |
| 6,578,498 B1 * | 6/2003 | Draudt | A47B 21/06 108/108 |
| 6,675,979 B2 | 1/2004 | Taylor | |
| D486,676 S * | 2/2004 | Campbell | D6/702 |
| 6,769,219 B2 | 8/2004 | Schwitte et al. | |
| 6,772,890 B2 * | 8/2004 | Campbell | A47F 5/0846 211/189 |

(56) References Cited

U.S. PATENT DOCUMENTS

| | | | |
|---|---|---|---|
| 6,827,028 B1 | 12/2004 | Callaway | |
| 6,971,614 B2* | 12/2005 | Fischer | A47F 5/0846 211/94.01 |
| 7,127,860 B2 | 10/2006 | Pervan | |
| 7,223,045 B2 | 5/2007 | Migli | |
| 7,228,977 B2* | 6/2007 | Perkins | A47B 83/001 211/87.01 |
| 7,300,120 B2* | 11/2007 | Shin | F25D 23/04 108/108 |
| 7,451,535 B2 | 11/2008 | Wells et al. | |
| 7,451,578 B2 | 11/2008 | Hannig | |
| 7,584,583 B2 | 9/2009 | Bergelin et al. | |
| 7,614,350 B2* | 11/2009 | Tuttle | A47B 97/00 108/23 |
| 7,621,092 B2 | 11/2009 | Groeke et al. | |
| 7,641,414 B1 | 1/2010 | Joyce | |
| 7,717,278 B2* | 5/2010 | Kao | B25H 3/04 206/349 |
| 7,721,503 B2 | 5/2010 | Pervan et al. | |
| 7,793,450 B2* | 9/2010 | Chasmer | A47F 5/0846 211/94.01 |
| 7,818,939 B2 | 10/2010 | Bearinger | |
| 7,998,549 B2 | 8/2011 | Susnjara | |
| 8,033,074 B2 | 10/2011 | Pervan | |
| 8,038,363 B2 | 10/2011 | Hannig | |
| 8,042,311 B2 | 10/2011 | Pervan | |
| 8,146,754 B2* | 4/2012 | Apgood, II | A47F 5/0846 211/59.1 |
| 8,220,217 B2 | 7/2012 | Muehlebach | |
| 8,234,830 B2 | 8/2012 | Pervan | |
| 8,365,499 B2 | 2/2013 | Nilsson et al. | |
| 8,387,327 B2 | 3/2013 | Pervan | |
| 8,464,408 B2 | 6/2013 | Hazzard | |
| 8,495,849 B2 | 7/2013 | Pervan | |
| 8,505,257 B2 | 8/2013 | Boo et al. | |
| 8,544,230 B2 | 10/2013 | Pervan | |
| 8,596,013 B2 | 12/2013 | Boo | |
| 8,602,227 B1* | 12/2013 | McDonald | A47F 5/0853 211/193 |
| 8,615,952 B2 | 12/2013 | Engström | |
| 8,713,886 B2 | 5/2014 | Pervan | |
| 8,745,952 B2 | 6/2014 | Perra | |
| 8,764,137 B2 | 7/2014 | Fehre | |
| 8,776,473 B2 | 7/2014 | Pervan | |
| 8,833,028 B2 | 9/2014 | Whispell et al. | |
| 8,864,407 B1 | 10/2014 | Sorum | |
| 8,882,416 B2 | 11/2014 | Baur et al. | |
| 8,887,468 B2 | 11/2014 | Håkansson et al. | |
| 9,175,703 B2 | 11/2015 | Maertens | |
| 9,216,541 B2 | 12/2015 | Boo | |
| 9,290,948 B2 | 3/2016 | Cappelle et al. | |
| 9,375,085 B2 | 6/2016 | Derelöv | |
| 9,538,842 B2 | 1/2017 | Håkansson et al. | |
| 9,655,442 B2 | 5/2017 | Boo et al. | |
| 9,700,157 B2* | 7/2017 | Keyvanloo | A47F 5/0853 |
| 9,714,672 B2 | 7/2017 | Derelöv et al. | |
| 9,723,923 B2 | 8/2017 | Derelöv | |
| 9,726,210 B2 | 8/2017 | Derelöv et al. | |
| 9,745,756 B2 | 8/2017 | Hannig | |
| 9,758,973 B2 | 9/2017 | Segaert | |
| 9,763,528 B2* | 9/2017 | Lung | A47F 5/0853 |
| 9,809,983 B2 | 11/2017 | Trudel | |
| 9,945,121 B2 | 4/2018 | Derelöv | |
| 10,034,541 B2 | 7/2018 | Boo et al. | |
| 10,202,996 B2 | 2/2019 | Håkansson et al. | |
| 10,378,570 B2 | 8/2019 | Broughton | |
| 10,415,613 B2 | 9/2019 | Boo | |
| 10,448,739 B2 | 10/2019 | Derelöv et al. | |
| 10,451,097 B2 | 10/2019 | Brännström et al. | |
| 2002/0170258 A1 | 11/2002 | Schwitte et al. | |
| 2004/0165946 A1 | 8/2004 | Areh et al. | |
| 2005/0042027 A1 | 2/2005 | Migli | |
| 2005/0236544 A1* | 10/2005 | Mancino | H02G 11/00 248/304 |
| 2005/0247653 A1* | 11/2005 | Brooks | A47F 5/0846 211/94.01 |
| 2006/0091093 A1* | 5/2006 | Armari | A47B 96/067 211/94.01 |
| 2006/0101769 A1 | 5/2006 | Pervan et al. | |
| 2006/0180561 A1* | 8/2006 | Wisnoski | A47F 5/0846 211/94.01 |
| 2006/0236642 A1 | 10/2006 | Pervan | |
| 2006/0273085 A1 | 12/2006 | Casto | |
| 2007/0006543 A1 | 1/2007 | Engström | |
| 2007/0028547 A1 | 2/2007 | Grafenauer et al. | |
| 2008/0010937 A1 | 1/2008 | Pervan et al. | |
| 2008/0066415 A1 | 3/2008 | Pervan | |
| 2008/0193209 A1 | 8/2008 | Henderson | |
| 2008/0216435 A1 | 9/2008 | Nolan | |
| 2008/0236088 A1 | 10/2008 | Hannig et al. | |
| 2009/0014401 A1* | 1/2009 | Tallman | A47F 5/0846 211/106.01 |
| 2009/0064624 A1 | 3/2009 | Sokol | |
| 2010/0028592 A1* | 2/2010 | Barkdoll | A47F 5/0846 428/99 |
| 2010/0083603 A1 | 4/2010 | Goodwin | |
| 2010/0104354 A1 | 4/2010 | Spalding | |
| 2010/0173122 A1 | 7/2010 | Susnjara | |
| 2010/0289389 A1 | 11/2010 | Crabtree, II | |
| 2011/0023303 A1 | 2/2011 | Pervan et al. | |
| 2011/0225921 A1 | 9/2011 | Schulte | |
| 2011/0225922 A1 | 9/2011 | Pervan et al. | |
| 2011/0280655 A1 | 11/2011 | Maertens et al. | |
| 2011/0283650 A1 | 11/2011 | Pervan et al. | |
| 2012/0009383 A1 | 1/2012 | Hardesty | |
| 2012/0027967 A1 | 2/2012 | Maertens et al. | |
| 2012/0073235 A1 | 3/2012 | Hannig | |
| 2012/0124932 A1 | 5/2012 | Schulte et al. | |
| 2012/0145845 A1 | 6/2012 | Hightower | |
| 2012/0180416 A1 | 7/2012 | Perra et al. | |
| 2012/0279161 A1 | 11/2012 | Håkansson et al. | |
| 2012/0286637 A1 | 11/2012 | Fehre | |
| 2013/0014463 A1 | 1/2013 | Pervan | |
| 2013/0048632 A1 | 2/2013 | Chen | |
| 2013/0071172 A1 | 3/2013 | Maertens et al. | |
| 2013/0081349 A1 | 4/2013 | Pervan | |
| 2013/0097846 A1 | 4/2013 | Pettigrew | |
| 2013/0111845 A1 | 5/2013 | Pervan | |
| 2013/0170904 A1 | 7/2013 | Cappelle et al. | |
| 2013/0232905 A2 | 9/2013 | Pervan | |
| 2013/0287484 A1 | 10/2013 | Phillips | |
| 2014/0013919 A1 | 1/2014 | Gerke et al. | |
| 2014/0055018 A1 | 2/2014 | Shein et al. | |
| 2014/0111076 A1 | 4/2014 | Devos | |
| 2014/0286701 A1 | 9/2014 | Sauer | |
| 2014/0294498 A1 | 10/2014 | Logan | |
| 2015/0034522 A1 | 2/2015 | Itou et al. | |
| 2015/0035422 A1 | 2/2015 | Håkansson et al. | |
| 2015/0078807 A1 | 3/2015 | Brännström et al. | |
| 2015/0078819 A1 | 3/2015 | Derelöv et al. | |
| 2015/0196118 A1 | 7/2015 | Derelöv | |
| 2015/0198191 A1 | 7/2015 | Boo | |
| 2015/0230600 A1 | 8/2015 | Schulte | |
| 2015/0368896 A1 | 12/2015 | Schulte | |
| 2016/0000220 A1 | 1/2016 | Devos | |
| 2016/0007751 A1 | 1/2016 | Derelöv | |
| 2016/0145029 A1 | 5/2016 | Ranade et al. | |
| 2016/0174704 A1 | 6/2016 | Boo et al. | |
| 2016/0186925 A1* | 6/2016 | Bettin | F16M 13/022 248/542 |
| 2016/0192775 A1 | 7/2016 | Andersson | |
| 2016/0270531 A1 | 9/2016 | Derelöv | |
| 2017/0079433 A1 | 3/2017 | Derelöv et al. | |
| 2017/0089379 A1 | 3/2017 | Pervan | |
| 2017/0097033 A1 | 4/2017 | Håkansson et al. | |
| 2017/0159291 A1 | 6/2017 | Derelöv | |
| 2017/0208938 A1 | 7/2017 | Derelöv et al. | |
| 2017/0227031 A1 | 8/2017 | Boo | |
| 2017/0227032 A1 | 8/2017 | Fridlund | |
| 2017/0227035 A1 | 8/2017 | Fridlund | |
| 2017/0234346 A1 | 8/2017 | Fridlund | |
| 2017/0298973 A1 | 10/2017 | Derelöv | |
| 2017/0360193 A1 | 12/2017 | Boo et al. | |

(56) References Cited

U.S. PATENT DOCUMENTS

| | | | |
|---|---|---|---|
| 2018/0080488 A1* | 3/2018 | Derelöv | A47B 88/43 |
| 2018/0087552 A1 | 3/2018 | Derelöv et al. | |
| 2018/0112695 A1 | 4/2018 | Boo et al. | |
| 2018/0119717 A1 | 5/2018 | Derelöv | |
| 2018/0202160 A1 | 7/2018 | Derelöv | |
| 2018/0283430 A1 | 10/2018 | Leistert | |
| 2018/0328396 A1 | 11/2018 | Fransson et al. | |
| 2019/0113061 A1 | 4/2019 | Håkansson et al. | |
| 2019/0166989 A1 | 6/2019 | Boo et al. | |
| 2019/0191870 A1 | 6/2019 | Derelöv | |
| 2019/0195256 A1 | 6/2019 | Derelöv | |
| 2019/0289999 A1 | 9/2019 | Derelöv et al. | |
| 2019/0320793 A1 | 10/2019 | Boo | |
| 2019/0323532 A1 | 10/2019 | Boo | |
| 2019/0323533 A1 | 10/2019 | Boo | |
| 2019/0323534 A1 | 10/2019 | Derelöv | |
| 2019/0323535 A1 | 10/2019 | Derelöv | |
| 2020/0003242 A1 | 1/2020 | Brännström et al. | |

FOREIGN PATENT DOCUMENTS

| | | |
|---|---|---|
| CH | 696 889 A5 | 1/2008 |
| CH | 698 988 B1 | 12/2009 |
| CH | 705 082 A2 | 12/2012 |
| CN | 101099618 A | 1/2008 |
| CN | 102 917 616 A | 2/2013 |
| CN | 203424576 U | 2/2014 |
| DE | 31 03 281 A1 | 8/1982 |
| DE | 32 42 884 A1 | 6/1983 |
| DE | 228 872 A1 | 10/1985 |
| DE | 26 35 237 A | 2/1987 |
| DE | 42 29 115 A1 | 3/1993 |
| DE | 94 17 168 U1 | 2/1995 |
| DE | 198 31 936 A1 | 2/1999 |
| DE | 298 20 031 U1 | 2/1999 |
| DE | 198 05 538 A1 | 8/1999 |
| DE | 203 04 761 U1 | 4/2004 |
| DE | 299 24 630 U1 | 5/2004 |
| DE | 20 2004 017 486 U1 | 4/2006 |
| DE | 20 2008 011 589 U1 | 11/2008 |
| DE | 20 2009 008 825 U1 | 10/2009 |
| DE | 10 2008 035 293 A1 | 2/2010 |
| DE | 10 2009 041 142 A1 | 3/2011 |
| DE | 10 2011 057 018 A1 | 6/2013 |
| DE | 10 2013 008 595 A1 | 11/2013 |
| DE | 10 2014 110 124 A1 | 1/2016 |
| DE | 20 2017 101 856 U1 | 4/2017 |
| EP | 0 042 170 A1 | 12/1981 |
| EP | 0 060 203 A2 | 9/1982 |
| EP | 0 060 203 A3 | 9/1982 |
| EP | 0 357 129 A1 | 3/1990 |
| EP | 0 362 968 A | 4/1990 |
| EP | 0 675 332 A2 | 10/1995 |
| EP | 0 871 156 A2 | 10/1998 |
| EP | 0 935 076 A1 | 8/1999 |
| EP | 1 048 423 A2 | 11/2000 |
| EP | 1 048 423 B9 | 5/2005 |
| EP | 1 671 562 A1 | 6/2006 |
| EP | 1 871 562 A1 | 6/2006 |
| EP | 1 650 375 A2 | 9/2006 |
| EP | 1 863 984 A1 | 12/2007 |
| EP | 1 922 954 A1 | 5/2008 |
| EP | 2 017 403 A2 | 1/2009 |
| EP | 2 037 128 A1 | 3/2009 |
| EP | 1 922 954 B1 | 7/2009 |
| EP | 2 333 353 A2 | 5/2011 |
| EP | 1 863 984 B1 | 11/2011 |
| EP | 2 487 373 A1 | 8/2012 |
| EP | 3 031 998 A1 | 6/2016 |
| FR | 2 062 731 A5 | 6/1971 |
| FR | 2 517 187 A1 | 6/1983 |
| FR | 2 597 173 A1 | 10/1987 |
| FR | 2 602 013 A1 | 1/1988 |
| GB | 1 022 377 A | 3/1966 |
| GB | 2 163 825 A | 3/1986 |
| GB | 2 482 213 A | 1/2012 |
| GB | 2 520 927 A | 6/2015 |
| JP | S53-113160 U | 9/1987 |
| JP | 2003-239921 A | 8/2003 |
| KR | 10-1147274 B1 | 8/2003 |
| KR | 2014-0042314 A | 4/2014 |
| WO | WO 87/07339 A1 | 12/1987 |
| WO | WO 90/07066 | 6/1990 |
| WO | WO 99/22150 A1 | 5/1999 |
| WO | WO 99/41508 A2 | 8/1999 |
| WO | WO 00/66856 A1 | 11/2000 |
| WO | WO 01/02669 A1 | 1/2001 |
| WO | WO 01/02670 A1 | 1/2001 |
| WO | WO 01/51733 A1 | 7/2001 |
| WO | WO 01/53628 A1 | 7/2001 |
| WO | WO 02/055809 A1 | 7/2002 |
| WO | WO 02/055810 A1 | 7/2002 |
| WO | WO 03/016654 A1 | 2/2003 |
| WO | WO 03/027510 A2 | 4/2003 |
| WO | WO 03/083234 A1 | 10/2003 |
| WO | WO 2004/079130 A1 | 9/2004 |
| WO | WO 2005/068747 A1 | 7/2005 |
| WO | WO 2008/017301 A2 | 2/2006 |
| WO | WO 2006/043893 A1 | 4/2006 |
| WO | WO 2006/103500 A1 | 10/2006 |
| WO | WO 2006/104436 A1 | 10/2006 |
| WO | WO 2007/015669 A2 | 2/2007 |
| WO | WO 2007/015669 A3 | 2/2007 |
| WO | WO 2007/079845 A1 | 7/2007 |
| WO | WO 2008/004960 A2 | 1/2008 |
| WO | WO 2008/004960 A3 | 1/2008 |
| WO | WO 2008/004960 A8 | 1/2008 |
| WO | WO 2008/017281 A1 | 2/2008 |
| WO | WO 2008/017301 A3 | 2/2008 |
| WO | WO 2008/150234 A1 | 12/2008 |
| WO | WO 2010/023042 A1 | 3/2010 |
| WO | WO 2010/070472 A2 | 6/2010 |
| WO | WO 2010/070472 A3 | 6/2010 |
| WO | WO 2010/070605 A2 | 6/2010 |
| WO | WO 2010/070605 A3 | 6/2010 |
| WO | WO 2010/082171 A2 | 7/2010 |
| WO | WO 2010/087752 A1 | 8/2010 |
| WO | WO 2011/012104 A2 | 2/2011 |
| WO | WO 2011/012104 A3 | 2/2011 |
| WO | WO 2011/085710 A1 | 7/2011 |
| WO | WO 2011/11758 A2 | 12/2011 |
| WO | WO 2011/151737 A2 | 12/2011 |
| WO | WO 2011/151737 A3 | 12/2011 |
| WO | WO 2011/151737 A9 | 12/2011 |
| WO | WO 2011/151758 A3 | 12/2011 |
| WO | WO 2012/095454 A1 | 7/2012 |
| WO | WO 2012/154113 A1 | 11/2012 |
| WO | WO 2013/009257 A1 | 1/2013 |
| WO | WO 2013/025163 A1 | 2/2013 |
| WO | WO 2013/080160 A1 | 6/2013 |
| WO | WO 2013/093636 A2 | 6/2013 |
| WO | WO 2013/093636 A3 | 6/2013 |
| WO | WO 2013/118075 A1 | 8/2013 |
| WO | WO 2014/072080 A1 | 5/2014 |
| WO | WO 2014/108114 A1 | 7/2014 |
| WO | WO 2014/121410 A1 | 8/2014 |
| WO | WO 2015/015603 A1 | 2/2015 |
| WO | WO 2015/038059 A1 | 3/2015 |
| WO | WO 2015/105449 A1 | 7/2015 |
| WO | WO 2015/105450 A1 | 7/2015 |
| WO | WO 2015/105451 A1 | 7/2015 |
| WO | WO 2016/099396 A1 | 6/2016 |
| WO | WO 2016/175701 A1 | 11/2016 |
| WO | WO 2017/131574 A1 | 8/2017 |
| WO | WO 2017/135874 | 8/2017 |
| WO | WO 2017/138874 A1 | 8/2017 |
| WO | WO 2018/080387 A1 | 5/2018 |

OTHER PUBLICATIONS

U.S. Appl. No. 14/573,572, Christian Boo, filed Dec. 17, 2014, (Cited herein as US Patent Application Publication No. 2015/0198191 A1 of Jul. 16, 2015).

(56) References Cited

OTHER PUBLICATIONS

U.S. Appl. No. 15/271,622, Peter Derelöv and Mats Nilsson, filed Sep. 21, 2016, (Cited herein as US Patent Application Publication No. 2017/0079433 A1 of Mar. 23, 2017).
U.S. Appl. No. 15/308,872, Darko Pervan, filed Nov. 4, 2016, (Cited herein as US Patent Application Publication No. 2017/0089379 A1 of Mar. 30, 2017).
U.S. Appl. No. 15/379,791, Niclas Håkansson and Darko Pervan, filed Dec. 15, 2016, (Cited herein as US Patent Application Publication No. 2017/0097033 A1 of Apr. 6, 2017).
U.S. Appl. No. 15/415,356, Peter Derelöv and Christian Boo, filed Jan. 25, 2017, (Cited herein as US Patent Application Publication No. 2017/0208938 A1 of Jul. 27, 2017).
U.S. Appl. No. 15/422,798, Magnus Fridlund, filed Feb. 2, 2017, (Cited herein as US Patent Application Publication No. 2017/0227035 A1 of Aug. 10, 2017).
U.S. Appl. No. 15/428,469, Magnus Fridlund, Feb. 9, 2017, (Cited herein as US Patent Application Publication No. 2017/0227032 A1 of Aug. 10, 2017).
U.S. Appl. No. 15/428,504, Christian Boo, filed Feb. 9, 2017, (Cited herein as US Patent Application Publication No. 2017/0227031 A1 of Aug. 10, 2017).
U.S. Appl. No. 15/432,190, Magbus Fridlund, filed Feb. 14, 2017, (Cited herein as US Patent Application Publication No. 2017/0234346 A1 of Aug. 17, 2017).
U.S. Appl. No. 15/642,757, Peter Derelöv, filed Jul. 6, 2017, (Cited herein as US Patent Application Publication No. 2017/0298973 A1 of Oct. 19, 2017).
U.S. Appl. No. 15/646,714, Peter Derelöv, filed Jul. 11, 2017, (Cited herein as US Patent Application Publication No. 2018/0087552 A1 of Mar. 29, 2018).
U.S. Appl. No. 15/567,507, Christian Boo, Peter Derelöv and Agne Pålsson, filed Oct. 18, 2017, (Cited herein as US Patent Application Publication No. 2018/0112695 A1 of Apr. 26, 2018).
U.S. Appl. No. 15/794,491, Peter Derelöv, filed Oct. 26, 2017, (Cited herein as US Patent Application Publication No. 2018/0119717 A1 of May 3, 2018).
U.S. Appl. No. 15/923,701, Peter Derelöv, filed Mar. 16, 2018.
U.S. Appl. No. 15/956,949, Peter Derelöv, filed Apr. 19, 2018.
U.S. Appl. No. 15/978,630, Jonas Fransson, Niclas Håkansson and Agne Pålsson, filed May 14, 2018.
U.S. Appl. No. 16/027,479, Christian Boo and Peter Derelöv, filed Jul. 5, 2018.
International Search Report/Written Opinion dated Jun. 21, 2016 in PCT/SE2016/050333, ISA/SE, Patent-och registreringsverket, Stockholm, SE, 10 pages.
**Derelöv, Peter, U.S. Appl. No. 15/923,701 entitled "Panels Comprising a Mechanical Locking Device and an Assembled Product Comprising the Panels", filed in the U.S. Patent and Trademark Office dated Mar. 16, 2018.
**Derelöv, Peter, U.S. Appl. No. 15/956,949 entitled "Panels for an Assembled Product", filed in the U.S. Patent and Trademark Office dated Apr. 19, 2018.
**Fransson, Jonas, et al., U.S. Appl. No. 15/978,630 entitled "Elements and a Locking Device for an Assembled Product," filed in the U.S. Patent and Trademark Office dated May 14, 2018.
**Boo, Christian, et al., U.S. Appl. No. 16/027,479 entitled "Panels Comprising a Mechanical Locking Device and an Assembled Product Comprising the Panels," filed in the U.S. Patent and Trademark Office dated Jul. 5, 2018.
Extended European Search Report issued in EP Patent Application No. 16783497.7, dated Oct. 11, 2018, European Patent Office, Munich, DE, 7 pages.

U.S. Appl. No. 16/220,574, Derelöv.
U.S. Appl. No. 16/220,585, Derelöv.
U.S. Appl. No. 16/228,975, Håkansson et al.
**Derelöv, Peter, U.S. Appl. No. 16/220,574 entitled "Set of Panels," filed in the U.S. Patent and Trademark Office dated Dec. 14, 2018.
**Derelöv, Peter, U.S. Appl. No. 16/220,585 entitled "Set of Panels," filed in the U.S. Patent and Trademark Office dated Dec. 14, 2018.
**Håkansson, Niclas, et al., U.S. Appl. No. 16/228,975 entitled "Mechanical Locking System for Building Panels," filed in the U.S. Patent and Trademark Office dated Dec. 21, 2018.
**Derelov, Peter, et al., U.S. Appl. No. 16/361,609 entitled "Panels Comprising a Mechanical Locking Device and an Assembled Product Comprising the Panels," filed in the U.S. Patent and Trademark Office dated Mar. 22, 2019.
**Boo, Christian, U.S. Appl. No. 16/386,732 entitled "Set of Panels With a Mechanical Locking Device," filed in the U.S. Patent and Trademark Office dated Apr. 17, 2019.
**Boo, Christian, U.S. Appl. No. 16/386,810 entitled "Set of Panels With a Mechanical Locking Device," filed in the U.S. Patent and Trademark Office dated Apr. 17, 2019.
**Boo, Christian, U.S. Appl. No. 16/386,824 entitled "Set of Panels With a Mechanical Locking Device," filed in the U.S. Patent and Trademark Office dated Apr. 17, 2019.
**Derelöv, Peter, U.S. Appl. No. 16/386,874 entitled "Symmetric Tongue and T-Cross," filed in the U.S. Patent and Trademark Office dated Apr. 17, 2019.
U.S. Appl. No. 16/361,609, Derelöv et al.
U.S. Appl. No. 16/386,732, Boo.
U.S. Appl. No. 16/386,810, Boo.
U.S. Appl. No. 16/386,824, Boo.
U.S. Appl. No. 16/386,874, Derelöv.
U.S. Appl. No. 16/553,325, Derelöv et al.
U.S. Appl. No. 16/553,350, Derelöv et al.
U.S. Appl. No. 16/567,436, Derelöv.
U.S. Appl. No. 16/663,603, Fridlund.
U.S. Appl. No. 16/697,335, Boo et al.
U.S. Appl. No. 16/703,077, Fridlund.
U.S. Appl. No. 16/722,096, Derelöv et al.
**Derelöv, Peter, U.S. Appl. No. 16/553,325 entitled "Set of Panels with a Mechanical Locking Device," filed in the U.S. Patent and Trademark Office dated Aug. 28, 2019.
**Derelöv, Peter, U.S. Appl. No. 16/553,350 entitled "Set of Panels with a Mechanical Locking Device," filed in the U.S. Patent and Trademark Office dated Aug. 28, 2019.
**Derelöv, Peter, U.S. Appl. No. 16/567,436 entitled "Panels Comprising a Mechanical Locking Device and an Assembled Product Comprising the Panels," filed in the U.S. Patent and Trademark Office dated Sep. 11, 2019.
**Fridlund, Magnus, U.S. Appl. No. 16/663,603 entitled "Element and Method for Providing Dismantling Groove," filed in the U.S. Patent and Trademark Office dated Oct. 25, 2019.
**Boo, Christian, et al., U.S. Appl. No. 16/697,335 entitled "Panels Comprising a Mechanical Locking Device and an Assembled Product Comprising the Panels," filed in the U.S. Patent and Trademark Office dated Nov. 27, 2019.
**Fridlund, Magnus, U.S. Appl. No. 16/703,077 entitled "Set of Panels for an Assembled Product," filed in the U.S. Patent and Trademark Office dated Dec. 4, 2019.
**Derelöv, Peter, et al., U.S. Appl. No. 16/722,096 entitled "Panels Comprising a Mechanical Locking Device and an Assembled Product Comprising the Panels," filed in the U.S. Patent and Trademark Office dated Dec. 20, 2019.

* cited by examiner

PANEL WITH A SLIDER

TECHNICAL FIELD OF THE INVENTION

The present invention relates to a fastening device for connecting a runner, such as a drawer runner to a panel, such as a building panel, a wall panel, furniture component or the like.

TECHNICAL BACKGROUND

Drawer sliders are known that are fixed to e.g. furniture by screws. A drawback with the known systems is that it time consuming to assemble the sliders to the furniture.

The above description of various known aspects is the applicant's characterization of such, and is not an admission that any of the above description is considered as prior art.

SUMMARY OF THE INVENTION

It is an object of certain embodiments of the present invention to provide an improvement over the above described techniques and known art. Particularly to reduce the time for assembling and the strength of the locking system is improved by embodiments of the invention.

At least some of these and other objects and advantages that will be apparent from the description have been achieved by a first aspect of the invention that comprises a set comprising a panel and a slider, such as a drawer slider, the slider comprising a slider surface and the panel comprising a panel surface, the slider is being configured to be assembled to the panel with the slider surface facing the panel surface. The panel surface is provided with an insertion groove and an undercut groove, which are of a longitudinal shape. A strip protrudes from the slider surface, and the strip is configured to be inserted into the insertion groove and the undercut groove by an angling motion.

A first strip surface at an outer part of the strip may be configured to cooperate with an outer surface of the undercut groove for locking the slider to the panel.

A first angle, which is between the outer surface of undercut groove and the panel surface, may be an acute angle, preferably in the range of about 15° to about 50°, more preferably about 30°.

A second angle, which is between first strip surface and the slider surface, may be an acute angle, preferably in the range of about 15° to about 50, more preferably about 30°.

An outer surface of the insertion groove may be configured to cooperate with a second strip surface at an inner strip part of the strip for locking the slider to the panel. A load on the slider may normally be at least partly carried by the outer surface, and the load presses the strip surface against the outer surface.

The outer surface of the insertion groove may be arranged opposite to the undercut groove.

An outer surface of the insertion groove may be arranged at the opening of the insertion groove.

A third angle, which is between the outer surface of the insertion groove and the panel surface, may be an acute angle or an essentially perpendicular angle, preferably in the range of about 60° to about 90°, more preferably about 80°.

A fourth angle, which is between the second strip surface and the slider surface, may be an acute angle or an essentially perpendicular angle, preferably in the range of about 60° to about 90°, more preferably about 80°.

A locking element may protrude from the slider surface and the panel surface may comprise a locking groove, preferably a hole, such as a drill hole, wherein the locking element is configured to cooperate with the locking groove for preventing the strip from being displaced along the insertion groove.

The strip may be provided with protruding parts, at an upper and/or lower surface, and/or at an outer edge, wherein the protruding parts are configured to cooperate with a surface of the insertion groove or the under cut groove for preventing the strip from being displaced along the insertion groove.

An intermediate strip part may be extending between the inner strip part and the outer strip part of the strip, wherein a fifth angle, which is between intermediate strip part and the inner strip part, is in the range of about 40° to about 90°, more preferably about 60°.

The intermediate strip part may comprise an edge part, which is configured to be arranged at the greatest distance from the opening of the insertion groove, wherein the edge part may be configured to be arranged at distance from a bottom surface of insertion groove.

The undercut groove may comprise an upper groove surface and the outer strip part may comprise an upper strip surface, wherein the upper groove surface and the upper strip surface may be configured to cooperate for locking the slider to the panel.

The upper groove surface and upper strip surface are preferably configured to have a tight fit in an assembled and locked position of the slider to the panel. A load may be applied such that a moment force is obtained that presses the upper surface against upper groove surface. A play between the upper groove surface and upper strip surface may cause a movement of the slider in relation to the panel, the insertion groove and the under cut groove, when a load is applied or a load is being displaced. The movement may overtime cause damages to the panel, the insertion groove, the undercut groove or the slider.

The strip, the groove and the under cut groove are preferably configured such that there is a play between the upper groove surface and upper strip surface during an assembling of the slider to the panel and until the assembled and locked position has been reached.

The strip may be provided with a friction connection, such as protruding parts, at an upper an/or lower surface, and/or at an outer edge, wherein the protruding parts are configured to cooperate with a surface of the insertion groove and/or the under cut groove for preventing the strip from being displaced along the insertion groove. The friction connection may be an alternative or a complement to the locking element and the locking groove.

The slider may comprise parts comprising a metal, produced of e.g. bent metal sheets. The slider may also comprise parts comprising a polymer, produced e.g. by injection moulding.

The core of the panel may be a wood-based core, preferably made of MDF, HDF, OSB, WPC, plywood or particleboard. The core may also be a plastic core comprising thermosetting plastic or thermoplastic e.g. vinyl, PVC, PU or PET. The plastic core may comprise fillers. The panel may be provided with a decorative layer, such as a foil or a veneer, on one or more surfaces. The panel may also be of solid wood.

The slider may, as an alternative, be a fixed carrying device for e.g. a shelf or other furniture component.

BRIEF DESCRIPTION OF THE DRAWINGS

The present invention will by way of example be described in more detail with reference to the appended schematic drawings, which shows embodiments of the present invention.

DETAILED DESCRIPTION

Figure 1:
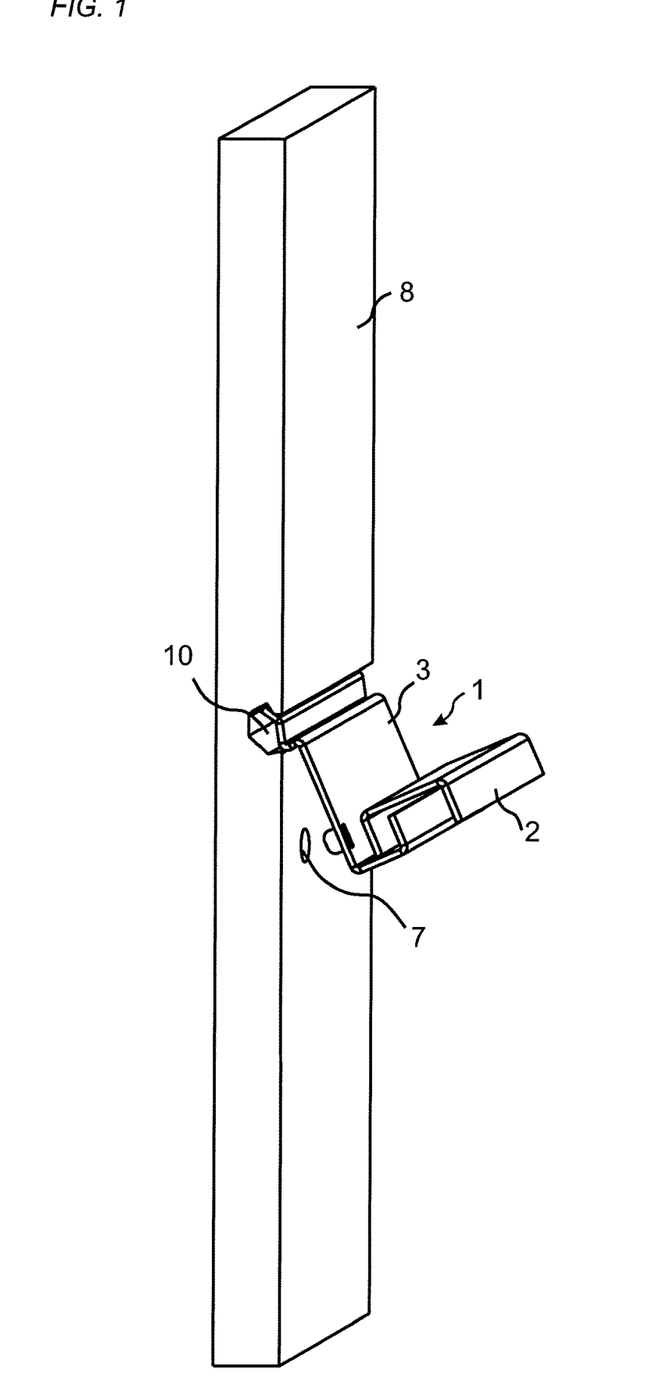
FIG. 1 shows an embodiment of the invention during assembling.
Figure 2A:
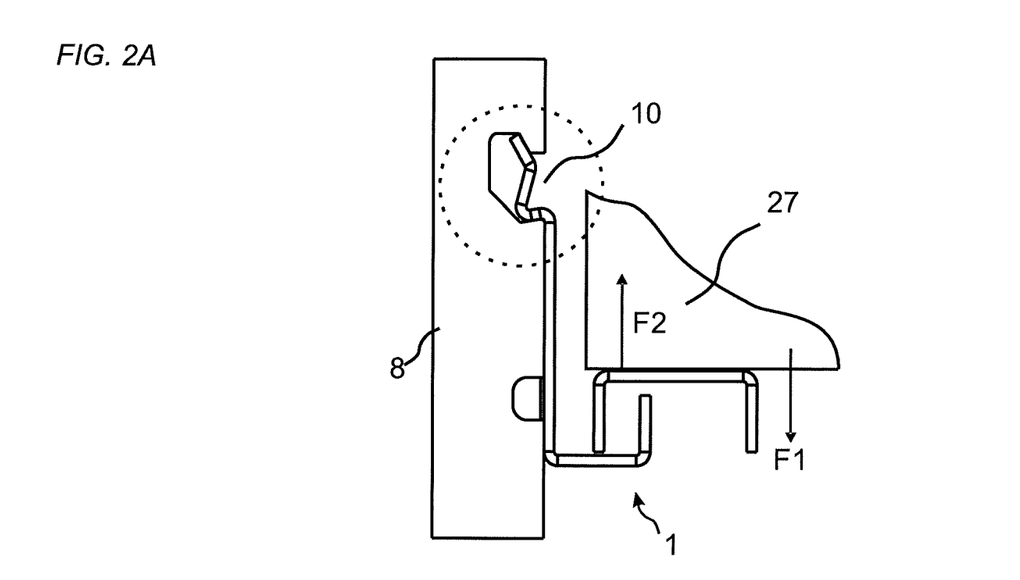
FIG. 2A shows an embodiment of the invention and FIG. 2B an enlargement of the encircled area of FIG. 2A.
Figure 2B:
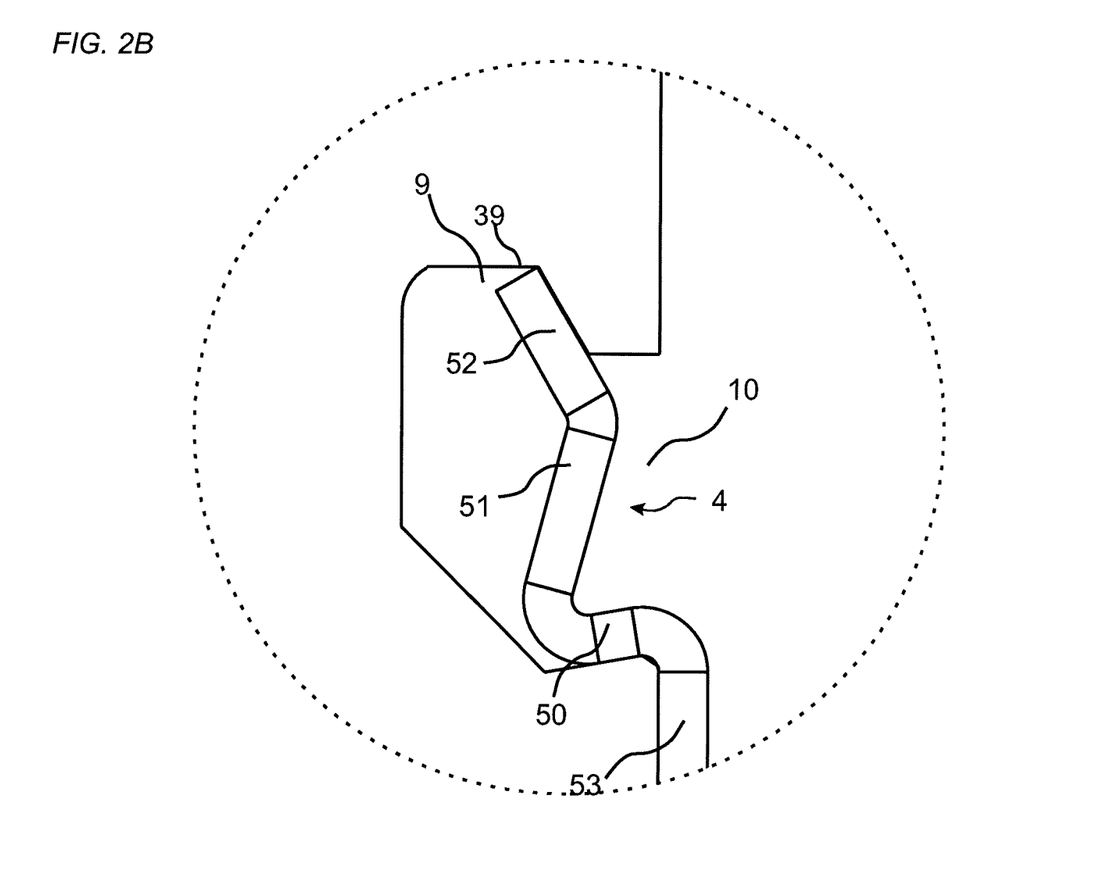
Figure 3A:
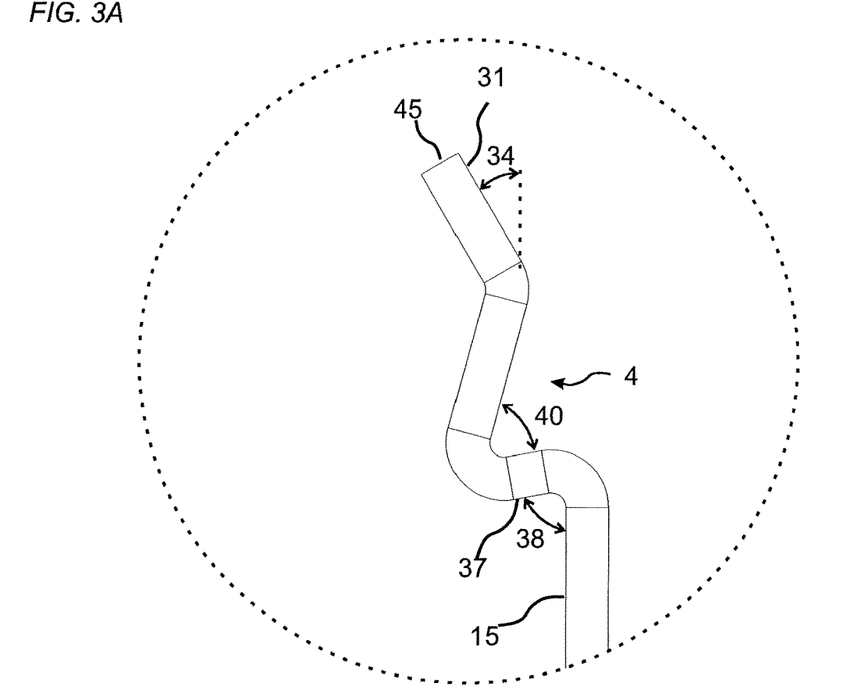
FIGS. 3A-B show parts in the enlargement in FIG. 2B.
Figure 3B:
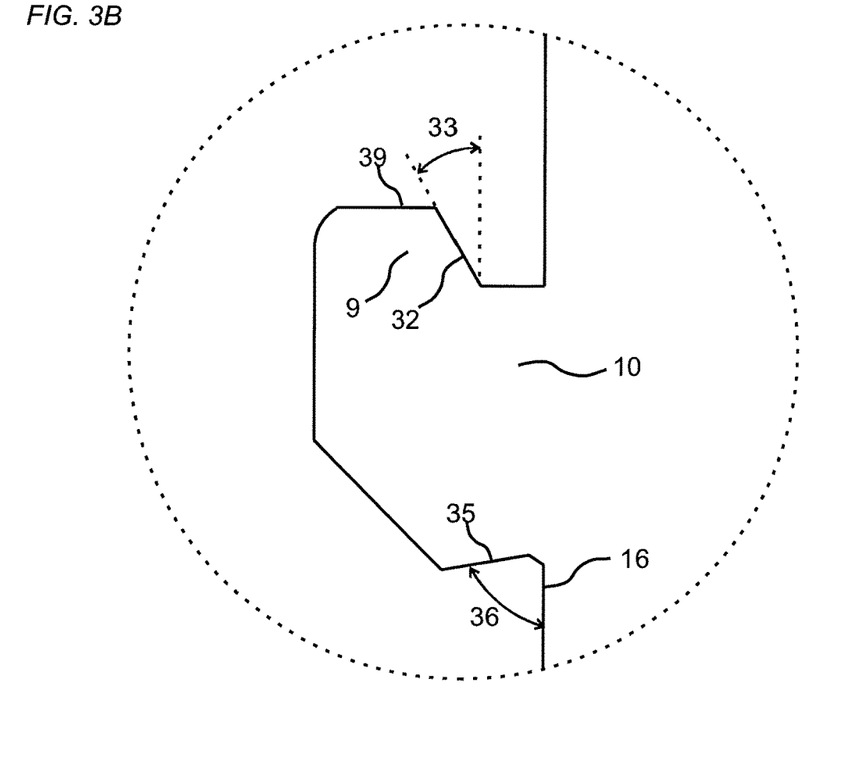

An embodiment of the invention is shown in FIG. 1 during assembling and in an assembled position in FIG. 2A. FIG. 2B shows an enlargement of the encircled area of FIG. 2A, which shows a schematic drawing of a panel 8 and a slider 1. The embodiment includes a set, which may be a part of a furniture or kitchen furnishing, comprising a panel 8 and a slider 1, such as a drawer slider. FIG. 3A shows the slider parts of FIG. 2B and FIG. 3B shows the panel parts of FIG. 2B. The panel may be of a rectangular shape and arranged such that it extends in a vertical direction. The slider may comprise an inner part 3, which is assembled to the panel, and an outer part, which is configure to be connected to a drawer (schematically shown in FIG. 2B). The outer part is displaceable relative the inner part. The slider comprises a slider surface 15 and the panel comprising a panel surface 16, as is shown in FIGS. 3A and 3B, respectively. The slider is configured to be assembled to the panel with the slider surface 15 facing the panel surface 16. The panel surface 16 is provided with an insertion groove 10 and an undercut groove 9, which preferably are of a longitudinal shape in a length direction of the slider, and may extend over essentially the entire panel.

The panel surface 16 is provided with an insertion groove 10 and an undercut groove 9, which are of a longitudinal shape and the strip 4 protrudes from the slider surface 15. The strip is configured to be inserted into the insertion groove 10 and the undercut groove 9 by an angling motion 42 (see FIG. 4A-D) when the slider is assembled to the panel.

A first strip surface 31 at an outer strip part 52 of the strip 4 cooperates with an outer surface 32 of undercut groove 9 for locking the slider 1 to the panel 8. A first angle 33, which is between the outer surface 32 of undercut groove and the panel surface 16, is an acute angle of about 30°. The first angle may be in the range of about 15° to about 50°.

A second angle 34, which is between first strip surface 31 and the slider surface 15, is an acute angle of about 30°. The second angle may be in the range of about 15° to about 50°.

An outer surface 35 of the insertion groove 10 is configured to cooperate with a second strip surface 37 at an inner strip part 50 of the strip for locking the slider 1 to the panel. The outer surface 35 of the insertion groove 10 is arranged opposite to the undercut groove 9. The outer surface 35 of the insertion groove 10 is arranged at the opening of the insertion groove 10. A third angle 36, which is between the outer surface 35 of the insertion groove 10 and the panel surface 16, is an acute angle of about 80°. The third angle may be an essentially perpendicular angle or in the range of about 60° to about 90°. A fourth angle 38, which is between the second strip surface 37 and the slider surface, is an acute angle of about 80°. The fourth angle may be an essentially perpendicular angle, or in the range of about 60° to about 90°.

An intermediate strip part 51 is extending between the inner strip part and the outer strip part 50, 52 of the strip 4. A fifth angle 40, which is between intermediate strip part and the inner strip part is an acute angle of about 60°. The fifth angle may be in the range of about 40° to about 90°.

The intermediate strip part 51 comprises an edge part, which is configured to be arranged at the greatest distance from the opening of the insertion groove. The edge part is configured to be arranged at distance from a bottom surface of insertion groove 10. The slider comprises a vertical strip part 53 that comprises the slider surface 15.

The first surface 15 of the slider may comprise a locking element 12 and the second surface of the panel may comprise a locking groove 7, preferably a hole, such as a drill hole. The locking element is configured to cooperate with the locking groove for preventing the strip from being displaced along the insertion groove.

When the drawer 27, schematically shown in FIG. 2A, with a load F1 is pulled out and the outer part 2 is displaced relative the inner part 3 a moment is created with an upwardly directed moment force F2 on the inner part of the slider. The undercut groove 9 comprises an upper groove surface 39 and the outer strip part 52 comprises an upper strip surface 45. The upper groove surface 39 and the upper strip surface 45 are configured to cooperate for locking the slider 1 to the panel 8. The upper groove surface 39 and upper strip surface 45 are configured to have a tight fit during the locking of the slider to the panel.

FIG. 4A-D show an assembling of an embodiment of the slider 1 and the panel 8. The slider is displaced 41 in an angled position against the panel and the strip is inserted into the insertion groove and the undercut groove. An angling motion and a displacement motion downward positions the inner strip part into the insertion groove and the second strip surface 37 of the inner strip part 50 against the surface 35 of the insertion groove.

Figure 4A:
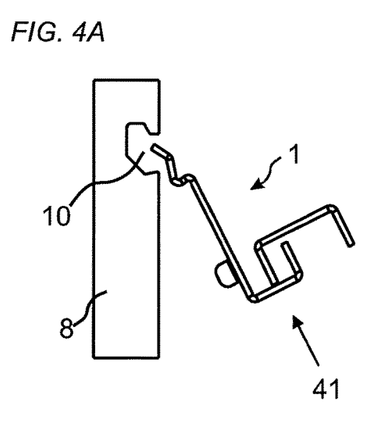
FIGS. 4A-D show an embodiment of an assembling of an embodiment of the invention.
Figure 4B:
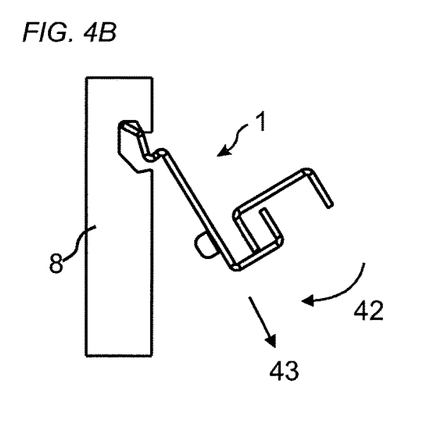
Figure 4C:
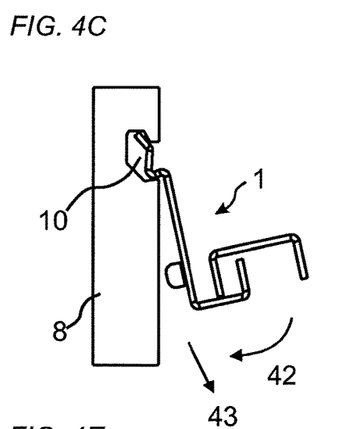
Figure 4D:
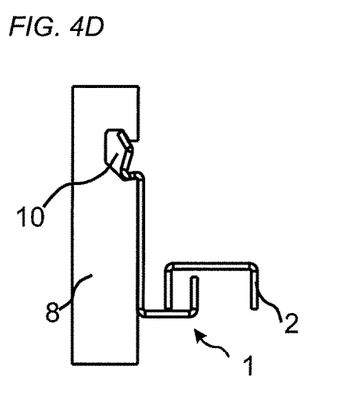
Figure 4E:
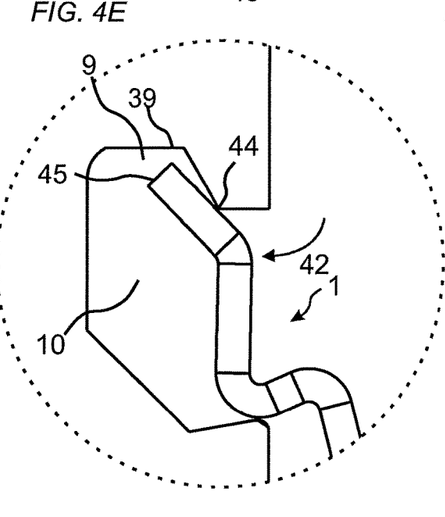
FIGS. 4E-F show an enlargement of embodiments during assembling of embodiments of the invention.

FIG. 4E shows an embodiment of the slider during the assembling. The angling motion is carried out around an edge 44 between the undercut groove and the insertion groove. The under cut groove is wide enough for having a play between the upper strip surface 45 and the upper undercut groove surface 39 during the angling motion until the strip part is in the locked and assembled position. The play may facilitate the assembling and disassembling.

Figure 4F:
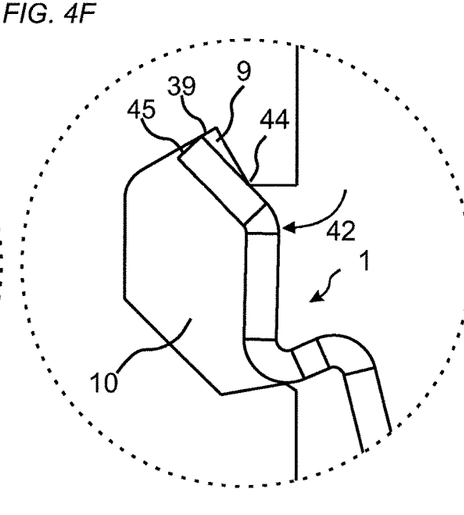

FIG. 4F shows another embodiment of the slider during the assembling. The angling motion is carried out around an edge 44 between the undercut groove and the insertion groove. The under cut groove is configured such that the upper strip surface 45 is displaced along the upper undercut groove surface 39 during the angling motion. The play may provide a more secure locking of the slider to the panel.

Figures 5A, 5B, 5C:
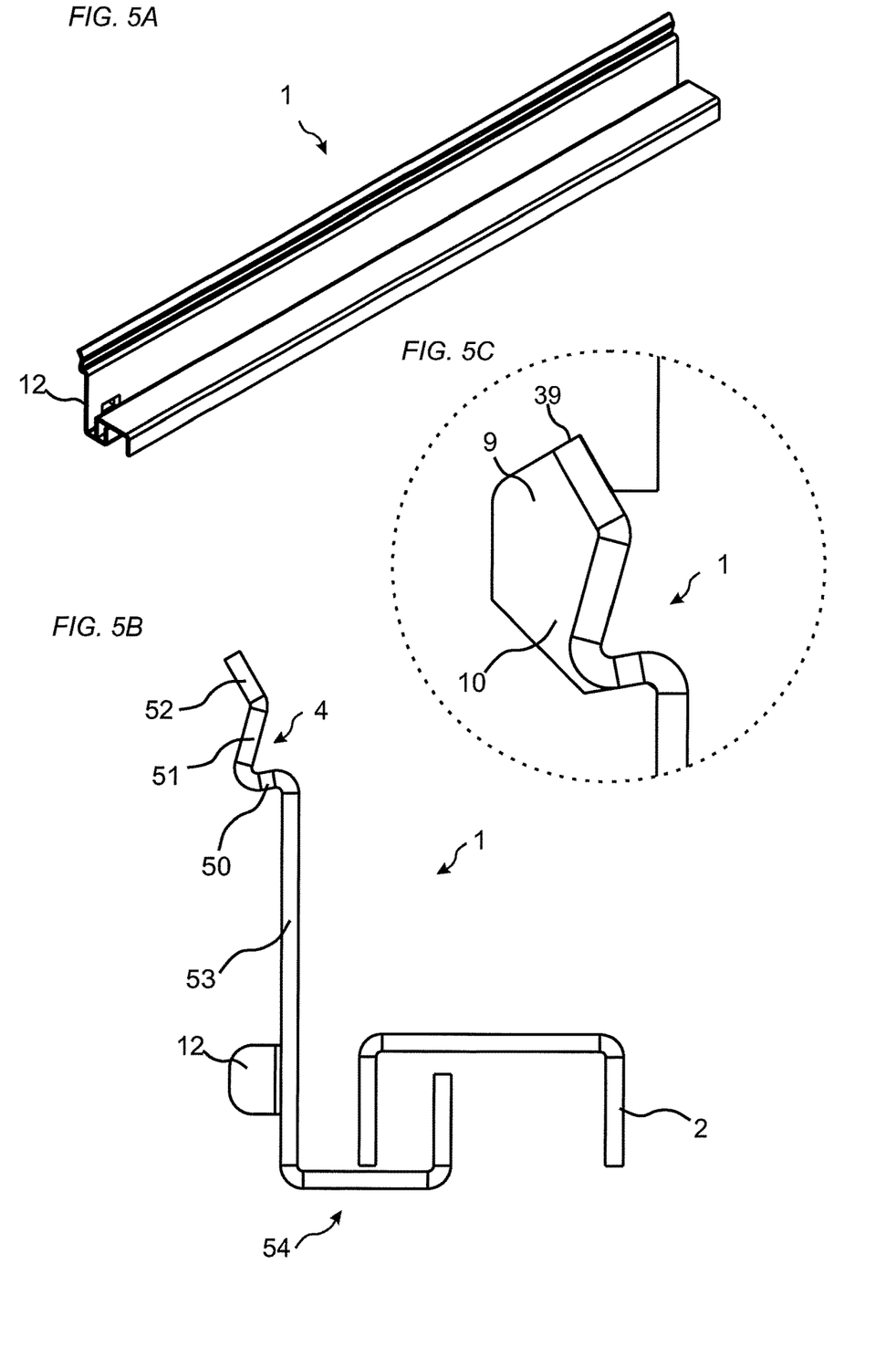
FIGS. 5A-B show an embodiment of a slider.
FIG. 5C shows an enlargement of an embodiment in an assembled and locked position.

FIG. 5A shows a 3D-view of an embodiment the slider and FIG. 5B shows a side view of the embodiment. The embodiment comprises a strip 4 that extend along the whole longitudinal length of the inner part 3 of the slider 1. The embodiment of the locking element 12 in the FIGS. 5A-5B has a length direction in a vertical direction. The length direction may be in other directions. A length direction in a horizontal direction may be an advantage for and embodiment that is configured to be inserted into a drilled hole during the assembling of the slider 1 to the panel 8. The locking element 12 may be produced by punching and bending a part of the inner part 3.

The upper groove surface 39 of the undercut groove may extend parallel or essentially parallel to the upper strip surface 45, as is shown in FIG. 5D, in order to obtain a larger cooperating surfaces for the locking. This may be an advantage for some weaker panel material.

Figure 6:
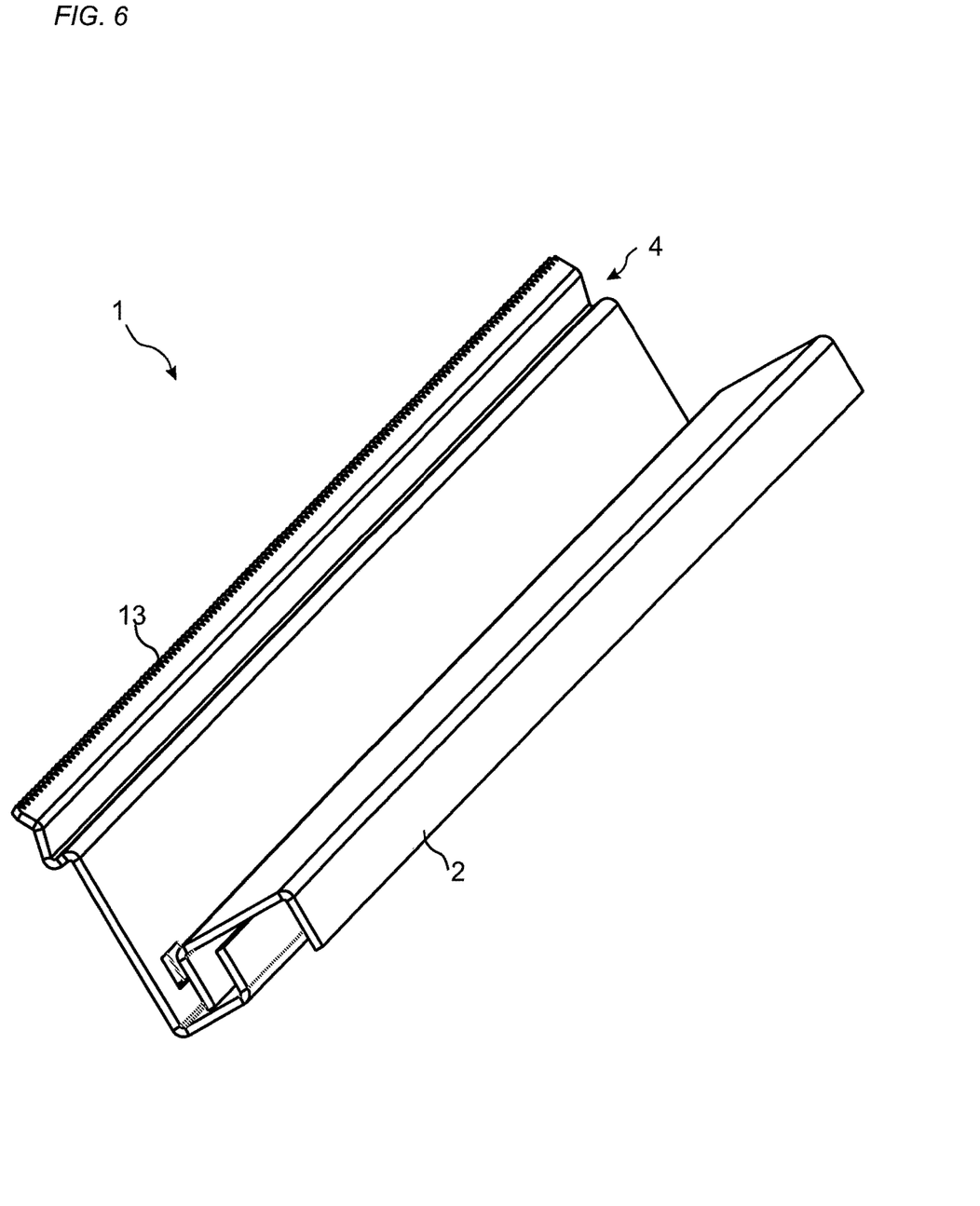
FIG. 6 shows an embodiment of the invention comprising a friction connection.

FIG. 6 shows an embodiment of the slider 1, which comprises an embodiment of a friction connection at the strip 4. The friction connection cooperates with a surface of the under cut groove 9, for preventing the strip from being displaced along the insertion groove. The friction connection may comprise protruding parts 13 at an upper an/or lower surface of the strip, and/or at an outer edge, wherein the protruding parts are configured to cooperate with a surface of the insertion groove.

Figure 7:
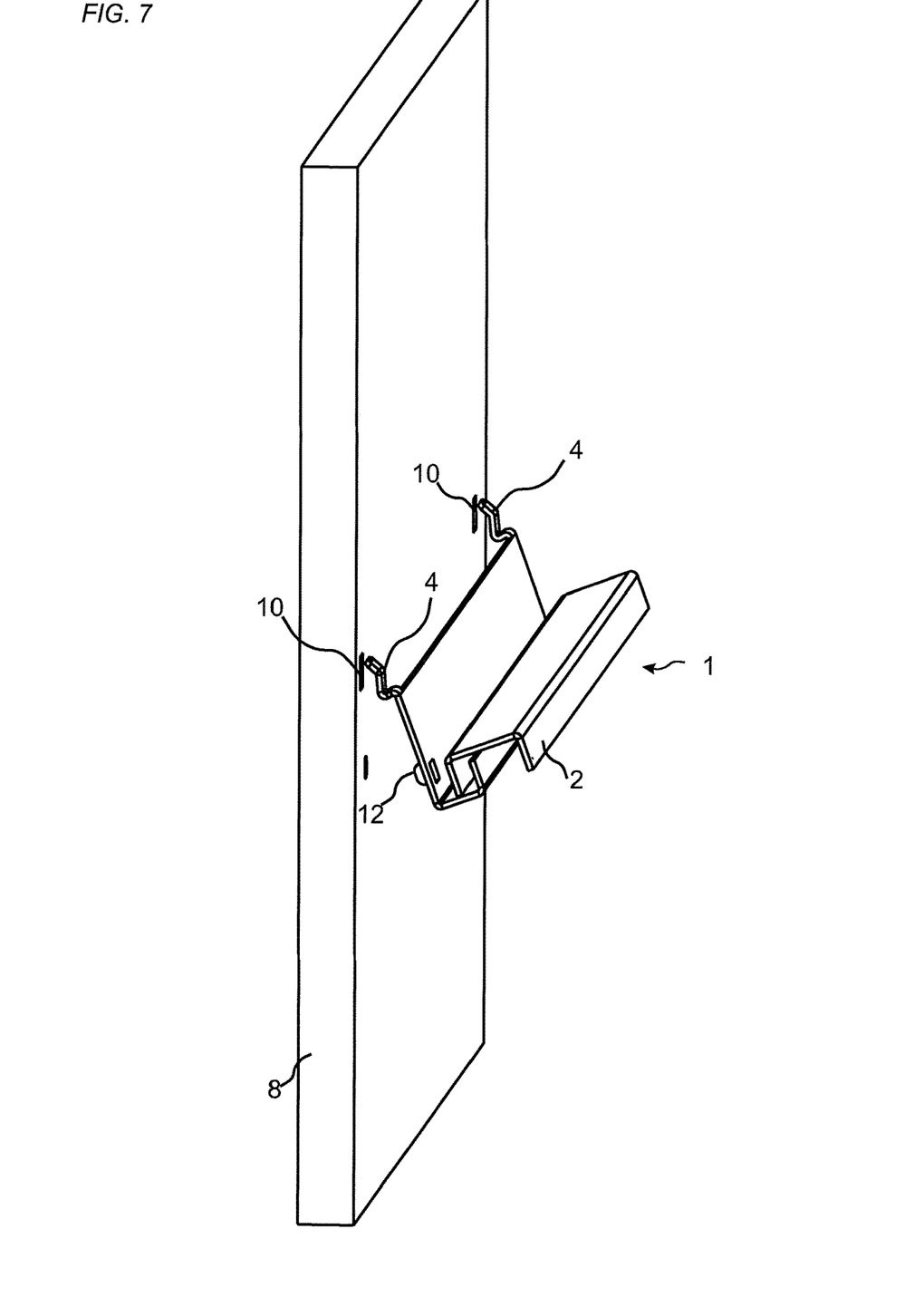
FIG. 7 shows an embodiment of the invention comprising a slider comprising two strips and a panel comprising two insertion grooves.

FIG. 7 shows an embodiment of the slider 1, which comprises two strips and the panel comprises two insertion grooves. Other embodiments may comprise three or more strips and three or more insertion grooves.

The invention claimed is:

1. A set comprising a panel and a slider, the slider comprising a first slider surface and the panel comprising a panel surface, the slider is configured to be assembled to the panel with the first slider surface facing the panel surface, wherein
the panel surface is provided with an insertion groove and an undercut groove, which are of a longitudinal shape in a longitudinal direction, a strip protrudes from the first slider surface, and
the strip is configured to be inserted into the insertion groove and the undercut groove into a locked position by an angling motion,
wherein, when the slider and the panel are in the locked position, the first slider surface extends along the panel surface and away from the insertion groove, and a second flat surface of the slider extends at an angle with the first slider surface and the panel surface, and the second flat surface extends in the longitudinal direction,
wherein the first slider surface and the second flat surface are coextensive in the longitudinal direction,
wherein a locking element protrudes from the first slider surface and the panel surface comprises a locking groove, the locking element being configured to cooperate with the locking groove for preventing the strip from being displaced along the insertion groove, wherein a total length of the locking groove in the longitudinal direction is smaller than the total length of the first slider surface in the longitudinal direction and wherein a total length of the locking element in the longitudinal direction is smaller than a total length of the first slider surface in the longitudinal direction.

2. The set as claimed in claim 1, wherein a first strip surface at an outer strip part of the strip is configured to cooperate with an outer surface of the undercut groove for locking the slider to the panel.

3. The set as claimed in claim 2, wherein a first angle, which is between the outer surface of the undercut groove and the panel surface, is an acute angle.

4. The set as claimed in claim 2, wherein a second angle, which is between the first strip surface and the first slider surface, is an acute angle.

5. The set as claimed in claim 2, wherein an intermediate strip part is extending between an inner strip part and the outer strip part of the strip, wherein a fifth angle, which is between the intermediate strip part and the inner strip part, is an acute angle.

6. The set as claimed in claim 5, wherein the intermediate strip part comprises an edge part, which is configured to be arranged at a greatest distance from the opening of the insertion groove, wherein the edge part is configured to be arranged at a distance from a bottom surface of the insertion groove.

7. The set as claimed in claim 1, wherein an outer surface of the insertion groove is configured to cooperate with a second strip surface at an inner strip part of the strip for locking the slider to the panel.

8. The set as claimed in claim 7, wherein the outer surface of the insertion groove is arranged opposite to the undercut groove.

9. The set as claimed in claim 7, wherein the outer surface of the insertion groove is arranged at an opening of the insertion groove.

10. The set as claimed in claim 7, wherein a third angle, which is between the outer surface of the insertion groove and the panel surface, is an acute angle or an essentially perpendicular angle.

11. The set as claimed in claim 7, wherein a fourth angle, which is between the second strip surface and the first slider surface, is an acute angle or an essentially perpendicular angle.

12. The set as claimed in claim 1, wherein the strip is provided with protruding parts, at an upper surface, and/or at a lower surface, and/or at an outer edge, wherein the protruding parts are configured to cooperate with a surface of the insertion groove or the under cut groove for preventing the strip from being displaced along the insertion groove.

13. The set as claimed in claim 1, wherein the undercut groove comprises an upper groove surface and an outer strip part comprises an upper strip surface, wherein an upper groove surface and the upper strip surface are configured to cooperate for locking the slider to the panel.

14. The set as claimed in claim 13, wherein the upper groove surface and upper strip surface are configured to contact one another in the locked position of the slider and the panel.

15. The set as claimed in claim 1, wherein the locking element and the locking groove are coextensive in the longitudinal direction.

16. The set as claimed in claim 1, wherein the locking groove is a drill hole.

17. A set comprising a panel and a slider, the slider comprising a first slider surface and the panel comprising a panel surface, the slider is configured to be assembled to the panel with the first slider surface facing the panel surface, wherein
the panel surface is provided with an insertion groove and an undercut groove, which are of a longitudinal shape in a longitudinal direction, a strip protrudes from the first slider surface, and
the strip is configured to be inserted into the insertion groove and the undercut groove into a locked position by an angling motion,
wherein, when the slider and the panel are in the locked position, the first slider surface extends along the panel surface and away from the insertion groove, and a second flat surface of the slider extends at an angle with the first slider surface and the panel surface, and the second flat surface extends in the longitudinal direction, wherein a vertical direction, a horizontal direction and the longitudinal direction are mutually perpendicular, and the second flat surface is longer in the longitudinal direction than in the vertical direction and than in the horizontal direction, wherein a locking element protrudes from the first slider surface and the panel surface comprises a locking groove, the locking element being configured to cooperate with the locking groove for preventing the strip from being displaced along the insertion groove, wherein a total length of the locking groove in the longitudinal direction is smaller than the total length of the first slider surface in the longitudinal direction and wherein a total length of the locking element in the longitudinal direction is smaller than a total length of the first slider surface in the longitudinal direction.

18. The set as claimed in claim 17, wherein the locking element and the locking groove are coextensive in the longitudinal direction.

19. The set as claimed in claim 17, wherein the locking groove is a drill hole.

* * * * *